(12) United States Patent
Tung et al.

(10) Patent No.: US 9,353,886 B2
(45) Date of Patent: *May 31, 2016

(54) SOLENOID VALVE HAVING AIR TAP STRUCTURE

(71) Applicant: Koge Micro Tech Co., Ltd, New Taipei (TW)

(72) Inventors: Cheng-Kai Tung, New Taipei (TW); Sheng-Min Yang, New Taipei (TW)

(73) Assignee: KOGE MICRO TECH CO., LTD., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/679,318

(22) Filed: Apr. 6, 2015

(65) Prior Publication Data

US 2015/0211654 A1 Jul. 30, 2015

Related U.S. Application Data

(63) Continuation-in-part of application No. 13/440,601, filed on Apr. 5, 2012, now Pat. No. 9,022,349.

(30) Foreign Application Priority Data

Dec. 29, 2011 (TW) .............................. 100149575 A

(51) Int. Cl.
| | |
|---|---|
| F16K 31/06 | (2006.01) |
| F16K 41/10 | (2006.01) |
| F16K 1/42 | (2006.01) |
| F16K 25/00 | (2006.01) |

(52) U.S. Cl.
CPC ................. *F16K 41/103* (2013.01); *F16K 1/42* (2013.01); *F16K 25/00* (2013.01); *F16K 31/0655* (2013.01)

(58) Field of Classification Search
CPC ............... F16K 1/42; F16K 1/44; F16K 7/14; F16K 25/00; F16K 31/06; F16K 31/0655
USPC ................ 251/129.15, 129.17, 333, 359, 366
See application file for complete search history.

(56) References Cited

U.S. PATENT DOCUMENTS

| | | | |
|---|---|---|---|
| 4,719,943 A | 1/1988 | Perach | |
| 5,758,864 A | 6/1998 | Asai | |
| 6,006,728 A | 12/1999 | Matsuda et al. | |

(Continued)

FOREIGN PATENT DOCUMENTS

| | | |
|---|---|---|
| CN | 201116610 Y | 9/2008 |
| CN | 101672383 A | 3/2010 |
| CN | 201616356 U | 10/2010 |
| CN | 101907179 A | 12/2010 |
| CN | 201779280 U | 3/2011 |

(Continued)

*Primary Examiner* — Matthew W Jellet
(74) *Attorney, Agent, or Firm* — Moser Taboada

(57) ABSTRACT

A solenoid valve includes a plunger head, an actuating device, a seal sheet and an air tap assembly. The actuating device has a connection member coupled with the plunger head. The seal sheet is disposed on the actuating device. The air tap assembly is secured to the actuating device and has a cavity. The air tap assembly includes a main body, a first and a second tubes. The first tube protrudes from the main body and defines a first through hole. The main body defines a second through hole communicated with the first through hole and the cavity. The second tube defines a third through hole. The main body defines a fourth through hole extended from the third through hole and a fifth through hole extended from the fourth through hole to the cavity. The plunger head is used to seal the second and fifth through holes.

11 Claims, 5 Drawing Sheets

(56) References Cited

U.S. PATENT DOCUMENTS

| | | |
|---|---|---|
| 6,089,538 A | 7/2000 | Shirkhan |
| 6,394,415 B1 | 5/2002 | Ohmi et al. |
| 7,594,516 B2 | 9/2009 | Maisch et al. |
| 8,430,378 B2 | 4/2013 | Hutchings et al. |
| 8,505,573 B2 * | 8/2013 | Herbert .................... F16K 7/16 137/554 |

FOREIGN PATENT DOCUMENTS

| | | |
|---|---|---|
| TW | 189564 | 8/1992 |
| TW | 249509 | 6/1995 |
| TW | 319343 | 11/1997 |
| TW | 526317 B | 4/2003 |
| TW | 200920976 A | 5/2009 |
| TW | 1338101 B | 3/2011 |
| TW | M415228 U | 11/2011 |

* cited by examiner though hole that is extended from the third through hole by a distance and a fifth through hole that is extended from the fourth through hole to the cavity to thereby communicate the third through hole and the fourth through hole with the cavity. The fifth through hole is parallel to the second through hole. The main body is formed with a circular opening on a bottom surface thereof. The circular opening surrounds the second through hole and communicates with the cavity and the fifth through hole. A top surface of the plunger head is used to seal the openings of the second and fifth through holes, and the circular opening.

According to another embodiment disclosed herein, the actuating device includes a valve core, a spring, a base, a coil rack, a housing, and two copper contacts. The valve core is connected with the connection member. The seal sheet is disposed on the valve core. The spring is located partly within the valve core. The base is connected with a bottom of the valve core via the spring. The coil rack covers the valve core and the base and an outer part of the coil rack is surrounded with copper wires. The housing covers the outer part of the coil rack. A top of each of the copper contacts is connected with a bottom of the coil rack, and a bottom of each of the copper contacts is connected with a power supply unit for an application of an electric current to the copper wires around the coil rack.

According to another embodiment disclosed herein, the connection member and the core valve are integrally connected.

According to another embodiment disclosed herein, the seal sheet is a rubber seal sheet.

According to another embodiment disclosed herein, the coil rack is a non-magnetic coil rack.

According to another embodiment disclosed herein, an outer surface of a lower part of the connection member is formed with an external screw thread, and the valve core is formed with a hole and an internal screw thread in the hole. The valve core is coupled with the connection member through engagement between the screw threads.

According to another embodiment disclosed herein, the valve core is an iron valve core.

According to another embodiment disclosed herein, the valve core and the base are magnetically attracted to each other after a current is applied to the copper wires around the coil rack through the copper contacts.

According to another embodiment disclosed herein, the solenoid valve having an air tap structure further includes a sealing component located between the base and the coil rack.

According to another embodiment disclosed herein, the air tap assembly further includes a retention plate located between the main body and the coil rack.

According to another embodiment disclosed herein, the seal sheet and the plunger head are integrally molded.

According to another embodiment disclosed herein, the first tube is substantially vertical to the second tube.

According to another embodiment disclosed herein, the second through hole and the circular opening are located substantially on the same level, and an area of the top surface of the plunger head is greater than a surface area of the circular opening.

Thus, the solenoid valve having an air tap structure herein not only avoids a situation in which the plunger head of the plunger deviates from a central axis of the solenoid valve, but also lowers an elasticity needed for displacing the plunger so that it blocks the openings through use of a pathway and opening design of the tubes.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The present invention provides a solenoid valve having an air tap structure that provides an enhanced configuration for tubes of the solenoid valve to thereby reduce lateral pressure and lower required elasticity.

Figure 1:
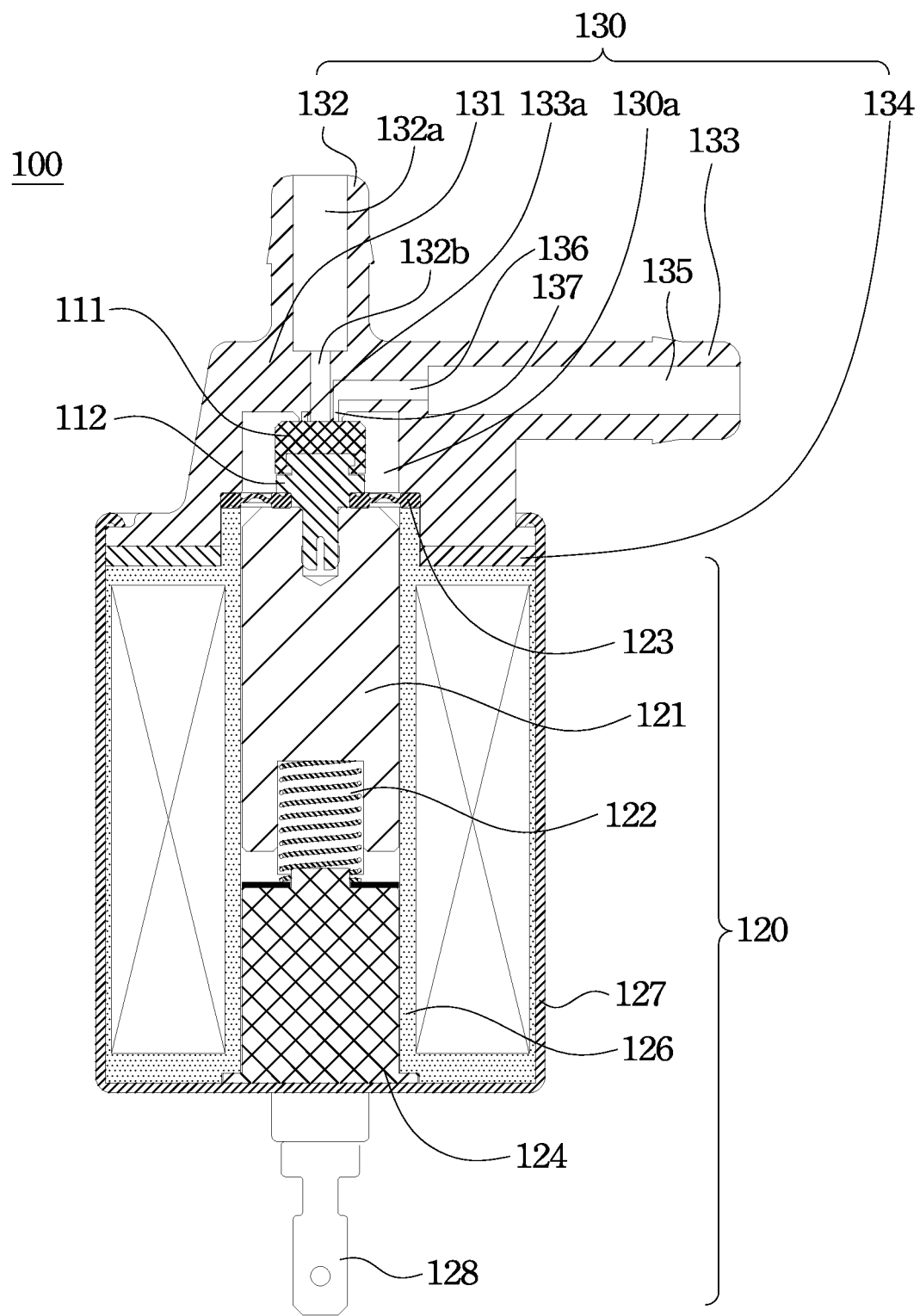
FIG. 1 illustrates a cross-sectional view of a solenoid valve having an air tap structure according to an embodiment of the present invention.
Figure 1A:
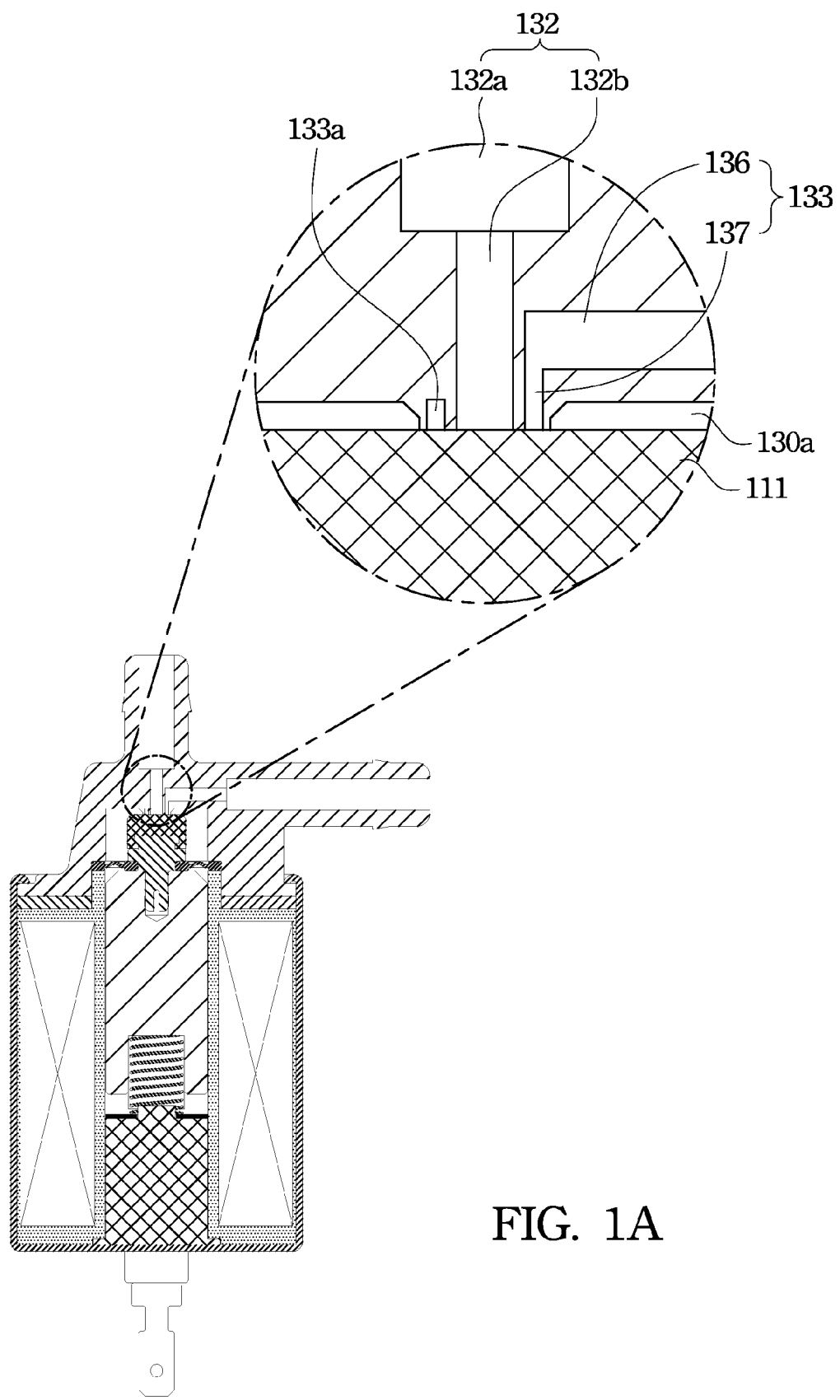
FIG. 1A is a view similar to FIG. 1, but illustrates a portion of the solenoid valve in a magnified state.
Figure 2:
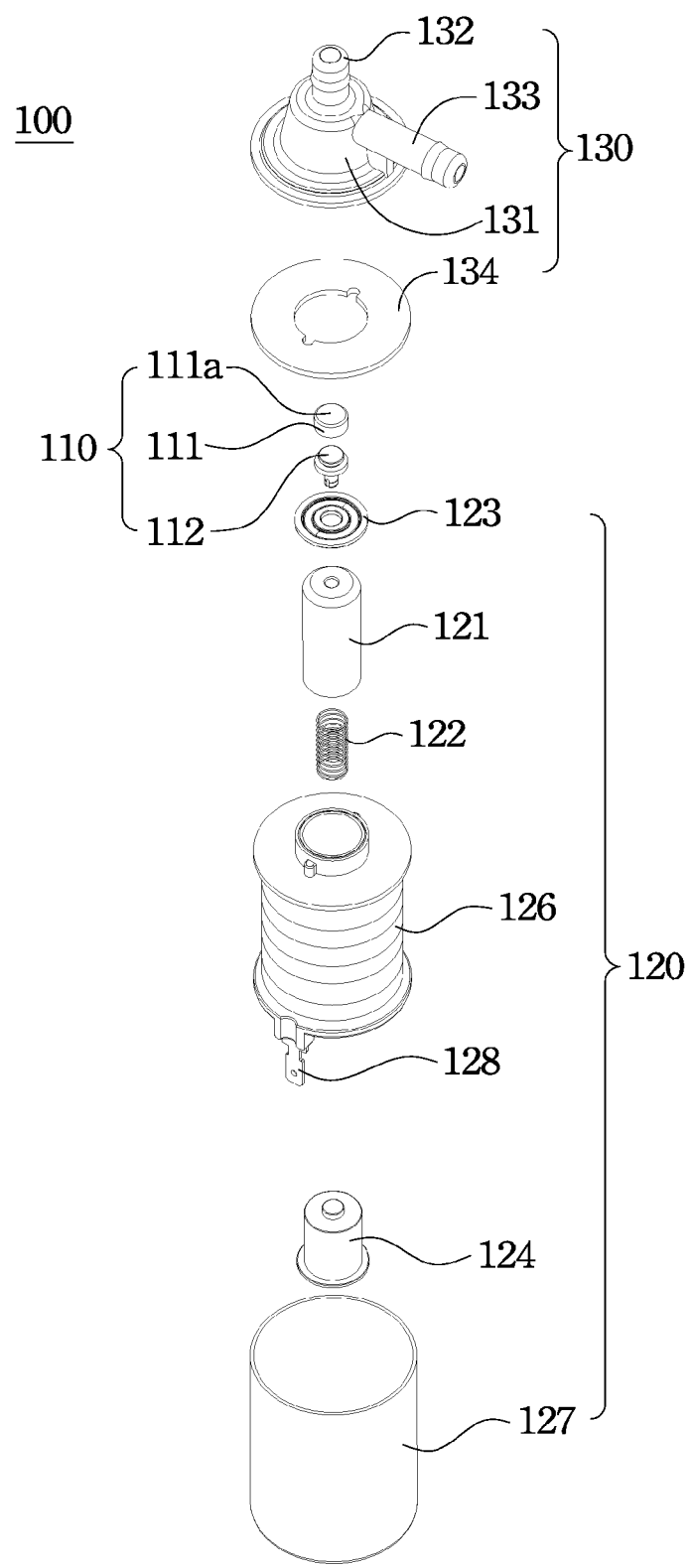
FIG. 2 illustrates an exploded view of the solenoid valve of FIG. 1.

FIG. 1 shows a cross-sectional view of a solenoid valve 100 having an air tap structure according to an embodiment of the present invention; FIG. 1A is a view similar to FIG. 1, but illustrates a portion of the solenoid valve 100 in a magnified state; and FIG. 2 shows an exploded view of the solenoid valve 100 of FIG. 1. As shown in FIG. 1, FIG. 1A, and FIG. 2, the solenoid valve 100 having an air tap structure includes a plunger head 111, an actuating device 120, a seal sheet 123 and an air tap assembly 130.

The actuating device 120 has a connection member 112 coupled with the plunger head 111 for moving the plunger head 111. The actuating device 120 includes a valve core 121, a spring 122, a base 124, a coil rack 126, a housing 127, and two copper contacts 128 (only one is shown in the drawings). The valve core 121 is connected with the connection member 112, and the seal sheet 123 is disposed on the valve core 121. The spring 122 is located partly within the valve core 121. In this embodiment, the valve core 121 is an iron valve core and is coupled with a lower part of the connection member 112. In some embodiments, an outer surface of the lower part of the connection member 112 is formed with an external screw thread, and the valve core 121 is formed with a hole and an internal screw thread in the hole, such that the valve core 121 can be securely coupled with the connection member 112 through engagement between the screw threads. The seal sheet 123 is disposed on the actuating device 120 around the connection member 112. In this embodiment, the seal sheet 123 is a rubber seal sheet. The seal sheet 123 is used to prevent air or liquid from reaching the valve core 121.

The base 124 is connected with a bottom of the valve core 121 via the spring 122, and the coil rack 126 covers the valve core 121 and the base 124. An outer part of the coil rack 126 is surrounded with copper wires. In this embodiment, the coil rack 126 is a non-magnetic coil rack.

The housing 127 covers the outer part of the coil rack 126 which is surrounded with copper wires. A top of each of the copper contacts 128 is connected with a bottom of the coil rack 126, and a bottom of each of the copper contacts 128 is connected with a power supply unit (not shown) for an application of an electric current to the copper wires around the coil rack 126 to thereby induce a magnetic field. In other words, the valve core 121 and the base 124 are magnetically attracted to each other after the electric current is applied to the copper wires around the coil rack 126 through the copper contacts 128. On the other hand, in practical applications, the copper contacts 128 can also be disposed along the outside of the housing 127 and be wrapped with an insulating layer (not shown). Thus, the copper contacts 128 can be protected and the chance to damage the copper contacts 128 is reduced.

The air tap assembly 130 is secured to the actuating device 120 and the air tap assembly 130 includes a main body 131, a first tube 132, and a second tube 133. The main body 131 has a cavity 130a for accommodating the plunger head 111. The air tap assembly 130 may further include a retention plate 134. The retention plate 134 is located between the main body 131 and the coil rack 126 for ensuring that the air tap assembly 130 is securely connected to the actuating device 120.

The first tube 132 protrudes from an outer surface of the main body 131 and defines a first through hole 132a that extends there through. The main body 131 defines a second through hole 132b that is extended from the first through hole 132a to the cavity 130a to thereby communicate the first through hole 132a with the cavity 130a. In some embodiments, the first and second through holes 132a, 132b are located along a central axis of the main body 131. The second through hole 132b is smaller in diameter than the first through hole 132a.

The second tube 133 protrudes from the outer surface of the main body 131 at an angle thereof such that the second tube 133 is not parallel with the first tube 132. In some embodiments, the second tube 133 is substantially perpendicular to the first tube 132. The second tube 133 defines a third through hole 135 that extends there through. The main body 131 further defines a fourth through hole 136 that is extended from the third through hole 135 by a distance, and a fifth through hole 137 that is extended from the fourth through hole 136 to the cavity 130a to thereby communicate the third through hole 135 and the fourth through hole 136 with the cavity 130a. The fifth through hole 137 is smaller in diameter than the fourth through hole 136, and the fourth through hole 136 is smaller in diameter than the third through hole 135.

In some embodiments, the first and second through holes 132a, 132b are perpendicular to the third and fourth through holes 135, 136, and the fifth through hole 137 is parallel to the first and second through holes 132a, 132b, as shown in FIGS. 1 and 1A, and therefore perpendicular to the third and fourth through holes 135, 136.

In some embodiments, each of the first and second tubes 132, 133 defines a through hole that is uniform in diameter, communicates with a through hole formed in the main body 131, and has substantially the same diameter as the corresponding through hole in the main body 131. In some embodiments, the through hole of the first or the second tube 132 or 133 and the corresponding through hole formed in the main body 131 gradually become narrow in a direction toward the cavity 130a. However, this does not intend to limit the present disclosure.

Figure 3:
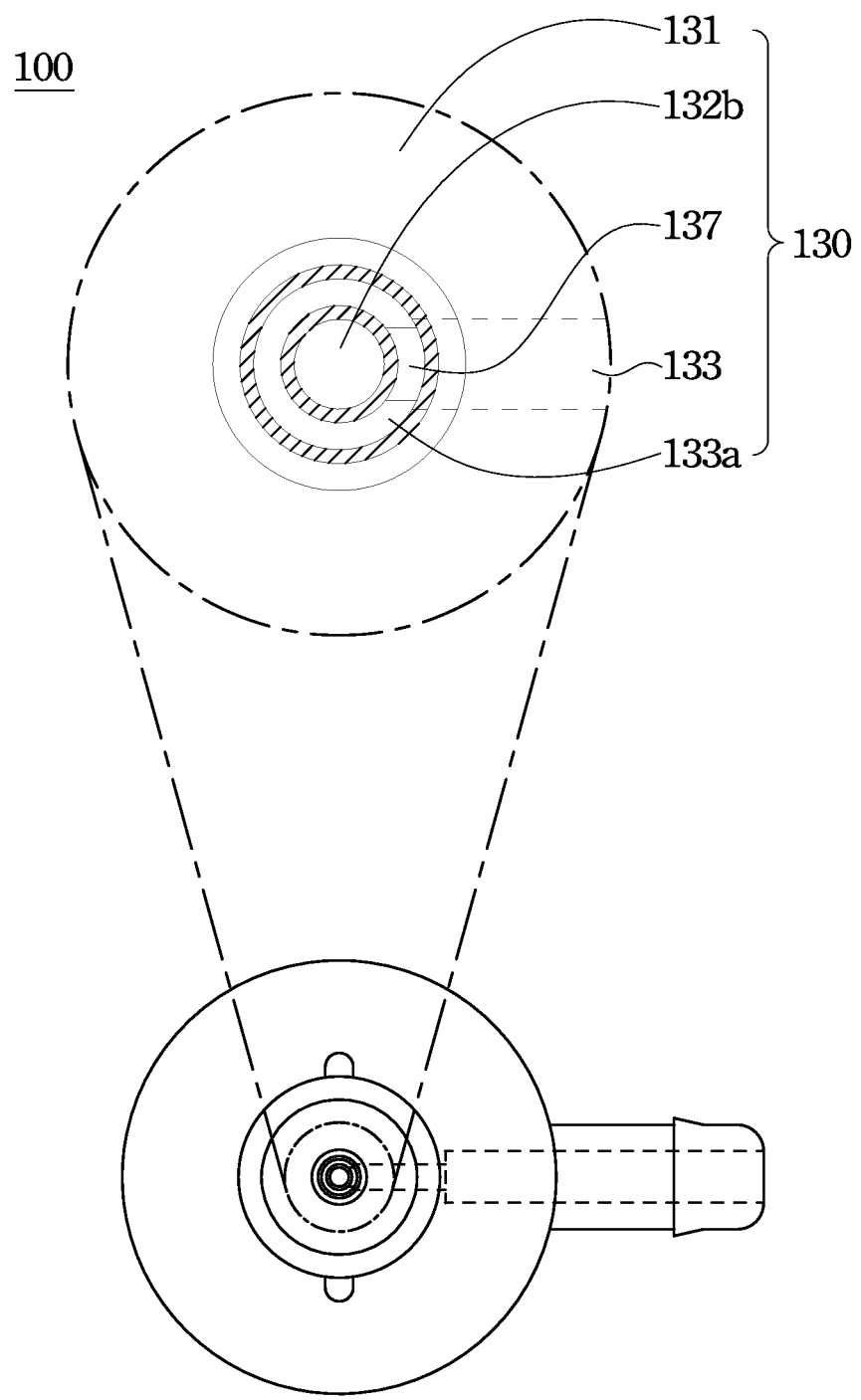
FIG. 3 illustrates a bottom view of the air tap assembly of the solenoid valve of FIG. 1.

FIG. 3 illustrates a bottom view of the air tap assembly 130 of the solenoid valve 100 of FIG. 1. With additional reference to FIG. 3, the main body 131 is formed with a circular opening 133a on a bottom surface of the main body 131. The circular opening 133a surrounds the second through hole 132b and communicates with the cavity 130a and the fifth through hole 137. More details related to the circular opening 133a will be provided below.

A top surface 111a of the plunger head 111 is used to seal the opening of the second through hole 132b, the opening of the fifth through hole 137, and the circular opening 133a, so as to prevent air or liquid from passing in and out of the first tube 132 or the second tube 133. In this embodiment, the second through hole 132b, which is communicated with the first through hole 132a defined by the first tube 132, and the circular opening 133a are located substantially on the same level, and an area of the top surface 111a of the plunger head 111 is greater than a surface area of the circular opening 133a.

When the actuating device 120 is not activated, the valve core 121 is pushed by the spring 122 so that the top surface 111a of the plunger head 111 seals the first tube 132 and the circular opening 133a, as well as the second tube 133. Therefore, the solenoid valve 100 having an air tap structure is in a closed condition and the first tube 132 and the second tube 133 are unable to transmit air or liquid to each other. When the actuating device 120 is activated, the power supply unit applies an electric current to the copper wires around the coil rack 126 through the copper contacts 128 to induce a magnetic field and thus magnetize the valve core 121 and the base 124. As a result, the valve core 121 is attracted to the base 124, the spring 122 is compressed and the plunger 111 is moved downward to open the first tube 132, the circular opening 133a and the second tube 133, such that the first tube 132 and the second tube 133 are communicated to each other. Thus, liquid or air can be transmitted between the first tube 132 and the second tube 133.

As shown in FIG. 1 and FIG. 3, the fifth through hole 137 is curved from the fourth through hole 136 and forms an opening with the circular opening 133a. The circular opening 133a is connected to the cavity 130a around an area surrounding the second through hole 132b. The top surface 111a of the plunger head 111 is used to block the first tube 132 (i.e., the second through hole 132b) and the circular opening 133a so as to prevent air or liquid from passing in and out of the first tube 132 or the circular opening 133a. The fifth through hole 137 communicates with the circular opening 133a such that pressure from the fifth through hole 137 is spread out to the circular opening 133a and thus prevents a centralized pressure and lowers a pressure of the unit area because the circular opening 133a has a bigger contact area than the fifth through hole 137.

Figure 4:
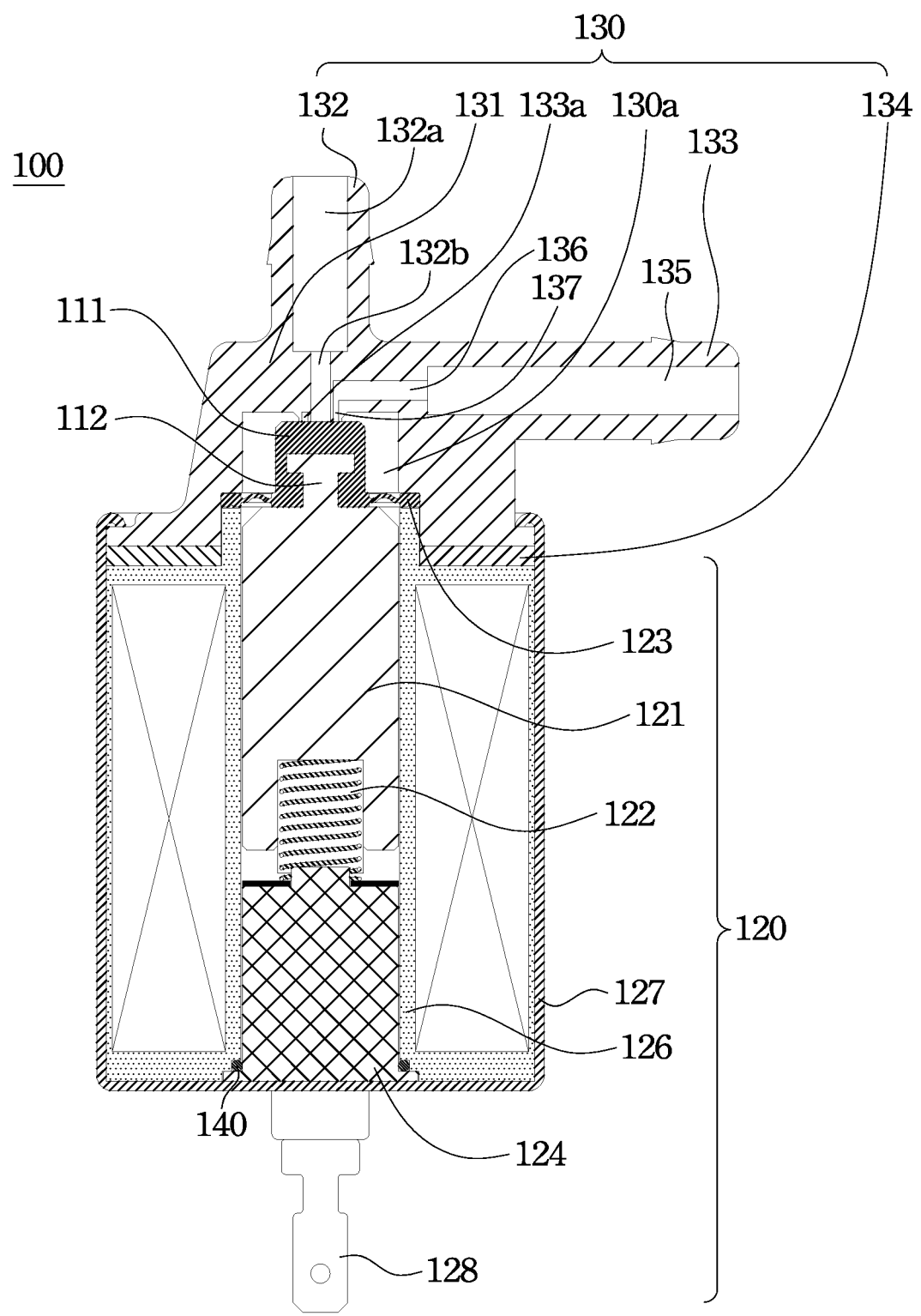
FIG. 4 illustrates a cross-sectional view of a solenoid valve having an air tap structure according to another embodiment of the present invention.

FIG. 4 illustrates a cross-sectional view of a solenoid valve 100 having an air tap structure according to another embodiment of the present invention. As shown in FIG. 4, the seal sheet 123 and the plunger head 111 are integrally molded. In this way, no gap can exist at the connection between the seal sheet 123 and the plunger head 111. Consequently, the leakage of air or liquid from the cavity 130a towards the valve core 121 is effectively eliminated, and the performance of the solenoid valve 100 having an air tap structure against leakage of air or liquid is further improved.

Furthermore, as shown in FIG. 4, the solenoid valve 100 having an air tap structure further includes a sealing component 140. The sealing component 140 is located between the base 124 and the coil rack 126 and acts as another defense. Even if air or liquid is leaked to the coil rack 126 from the cavity 130a, the sealing component 140 acts to prevent air or liquid from further escaping from the coil rack 126. Thus, the performance of the solenoid valve 100 having an air tap structure against leakage of air or liquid is further improved.

In order to reduce the production cost, as shown in FIG. 4, the connection member 112 and the core valve 121 are integrally connected. In addition, with the seal sheet 123 and the plunger head 111 integrally molded, the procedure to couple the seal sheet 123 and the plunger head 111 to the connection member 112 integrally connected to the core valve 121 is made simple and easy. Therefore, the cost for the assembly of the solenoid valve 100 having an air tap structure is accordingly reduced.

According to the embodiments described above, the solenoid valve having an air tap structure of the present invention provides an enhanced configuration for the tubes to thereby reduce pressure on a lateral portion of the plunger and lower a required elasticity used to displace the plunger to block the first tube, the circular opening and the second tube. Such advantages are realized through a pathway and opening design of the first tube and the second tube.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A solenoid valve having an air tap structure comprising:
a plunger head;
an actuating device having a connection member coupled with the plunger head for moving the plunger head;
a seal sheet disposed on the actuating device around the connection member; and
an air tap assembly secured to the actuating device comprising:
a main body having a cavity for accommodating the plunger head;
a first tube protruding from an outer surface of the main body and defining a first through hole that extends therethrough, the main body defining a second through hole communicated with the first through hole and with the cavity, the first and second through holes being located along a central axis of the main body; and
a second tube protruding from the outer surface of the main body at an angle thereof such that the second tube is not parallel with the first tube, the second tube defining a third through hole that extends therethrough, the main body defining a fourth through hole that is extended from the third through hole by a distance and a fifth through hole that is extended from the fourth through hole to the cavity to thereby communicate the third through hole and the fourth through hole with the cavity, the fifth through hole being parallel to the second through hole;
wherein the main body is formed with a circular opening on a bottom surface thereof, the circular opening surrounding the second through hole and communicating with the cavity and the fifth through hole; and
wherein a top surface of the plunger head is used to seal the openings of the second and fifth through holes, and the circular opening, wherein the actuating device comprises:
a valve core connected with the connection member, and the seal sheet is disposed on the valve core;
a spring located partly within the valve core;
a base connected with a bottom of the valve core via the spring;
a coil rack covering the valve core and the base, an outer part of the coil rack being surrounded with copper wires;
a housing covering the outer part of the coil rack; and two copper contacts, a top of each of the copper contacts being connected with a bottom of the coil rack, and a bottom of each of the copper contacts being connected with a power supply unit for an application of an electric current to the copper wires around the coil rack, wherein an outer surface of a lower part of the connection member is formed with an external screw thread, and the valve core is formed with a hole and an internal screw thread in the hole, wherein the valve core is coupled with the connection member through engagement between the screw threads.

2. The solenoid valve having an air tap structure of claim 1, wherein the connection member and the core valve are integrally connected.

3. The solenoid valve having an air tap structure of claim 1, wherein the seal sheet is a rubber seal sheet.

4. The solenoid valve having an air tap structure of claim 1, wherein the coil rack is a non-magnetic coil rack.

5. The solenoid valve having an air tap structure of claim 1, wherein the valve core is an iron valve core.

6. The solenoid valve having an air tap structure of claim 1, wherein the valve core and the base are magnetically attracted to each other after the electric current is applied to the copper wires around the coil rack through the copper contacts.

7. The solenoid valve having an air tap structure of claim 1, further comprising a sealing component located between the base and the coil rack.

8. The solenoid valve having an air tap structure of claim 1, the air tap assembly further comprising a retention plate located between the main body and the coil rack.

9. The solenoid valve having an air tap structure of claim 1, wherein the seal sheet and the plunger head are integrally molded.

10. The solenoid valve having air tap structure of claim 1, wherein the first tube is substantially vertical to the second tube.

11. The solenoid valve having air tap structure of claim 1, wherein an area of the top surface of the plunger head is greater than a surface area of the circular opening.

* * * * *